Patented Dec. 13, 1938

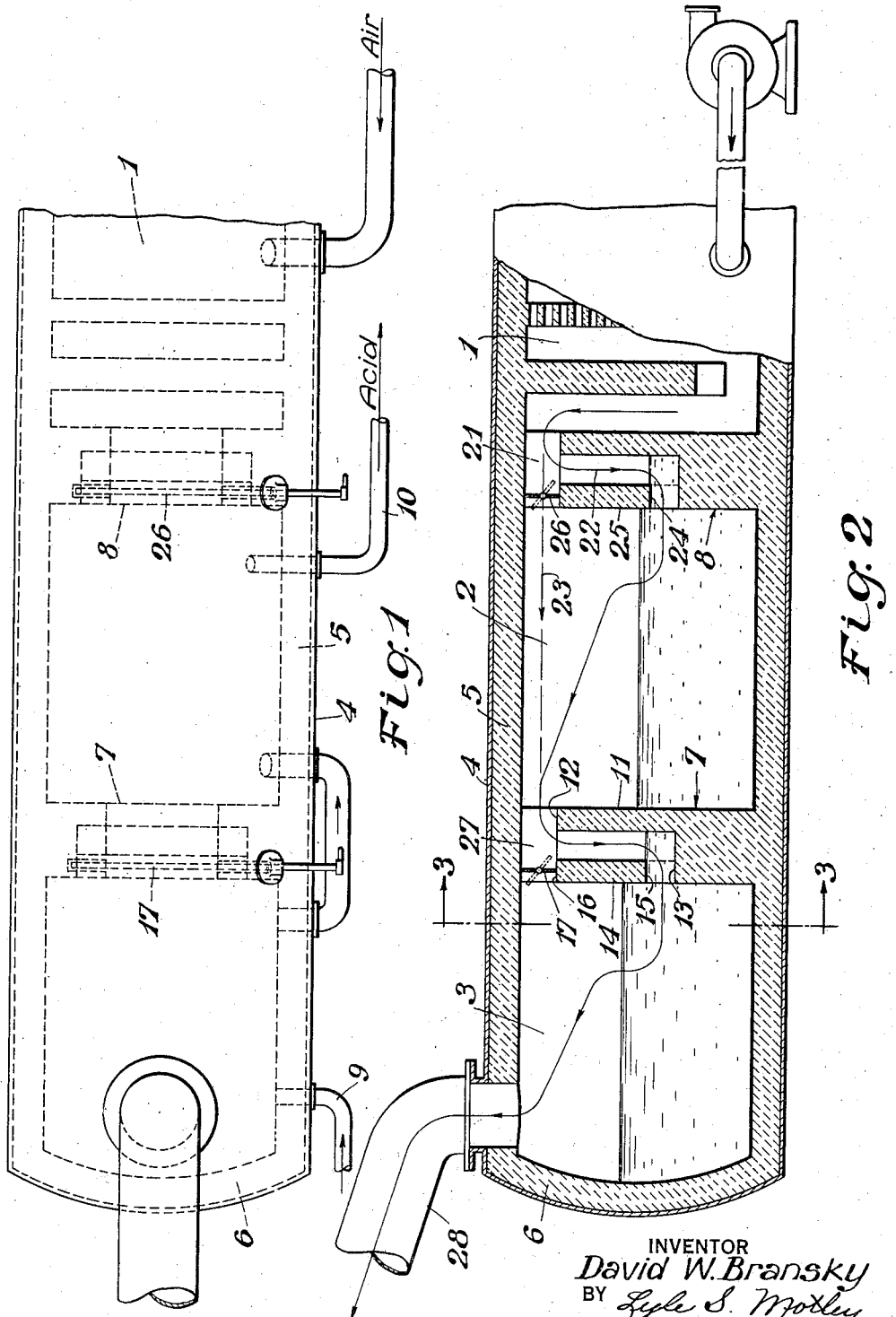

2,140,070

UNITED STATES PATENT OFFICE 2,140,070

APPARATUS FOR CONCENTRATING SULPHURIC ACID

David W. Bransky, Chicago, Ill., assignor to Standard Oil Company, Chicago, Ill., a corporation of Indiana Application November 2, 1936, Serial No. 108,774

5 Claims. (Cl. 23—275)

This invention relates to the concentration of sulphuric acid and particularly to the concentration of sludge acid, i. e., the acid recovered from the sludge resulting from the usual acid treatment of petroleum fractions.

It is an object of the present invention to provide a more economical and effective process and apparatus for concentrating sulphuric acid than has heretofore been in use.

It is an object of the present invention to provide an improved apparatus for effecting a more complete and efficient utilization of the available heat in the hot gases employed, and to provide for the absorption of acid vapors by bubbling the gas passing from a more concentrated portion of acid through a less concentrated portion of acid.

It is a further object of the present invention to provide an arrangement of means particularly adapted to effect a material reduction in the sulphuric acid mist entrained in the effluent gases, and thereby reduce the odor and other undesirable effects caused by the discharge of this mist into the atmosphere.

It is a still further object of the present invention to provide an arrangement of means particularly adapted to effect a material reduction in the necessary blower pressure for a given capacity.

My invention will be described more particularly with reference to the accompanying drawings in which:

Figure 1 is a top plan view of my concentrator;

Figure 2 is an elevation of a transverse cross-section of the apparatus shown in Figure 1;

Figure 3:
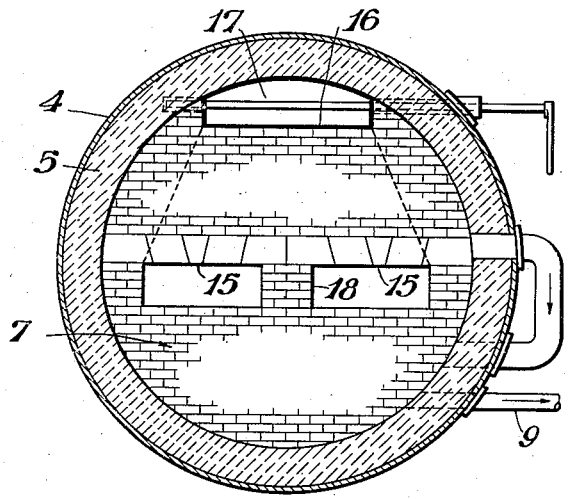
Figure 3 is a cross-section view taken on line 3—3 of Figure 2.

The general method of acid concentration to which the present improvement in apparatus relates consists briefly in maintaining a plurality of bodies of acid defining a plurality of stages, passing hot gases through said stages in succession, and causing definite fractions of the total flow of hot gases to be delivered under pressure beneath the surface of the respective bodies of acid, so as to bubble upwardly therethrough. The remaining fraction of the total flow is passed directly into the vapor space above the liquid level. The direction of flow of hot gases through the successive bodies of acid is in general preferably counter-current to the direction of flow of acid.

Referring particularly to Figure 2, I have illustrated an acid concentrating apparatus comprising a furnace stage 1, a strong acid chamber 2 and a weak acid chamber 3, all disposed in series relation. A shell or drum-shaped steel tank 4 is provided with suitable lining of acid proof masonry 5. This shell is divided into two vessels by means of a forward end wall 6, an intermediate dividing wall 7, and a rear end wall 8. The furnace section 1 is connected with the rear end wall 8. Suitable conduits 9 and 10 are provided for introducing acid to and withdrawing acid from the respective vessels, and for maintaining a definite liquid level therein. The furnace 1, for delivering hot gases to the opening in the rear end wall, is conventional.

I have provided a new and novel construction for the intermediate dividing wall 7 and the rear end wall 8. The intermediate dividing wall 7 comprises an upper relatively thin portion 11, extending completely across the vessel, formed near its top with an opening 12 for the passage of hot gases from the concentrated stage 2 into the vapor space in the weak acid stage 3 and formed near its lower relatively thick portion with a shelf like offset support 13 on the side adjacent the weak acid chamber. A second or baffle wall 14 extends completely across the vessel and divides the vapor space above the liquid surface in the weak acid stage into two chambers. The lower edge of this wall extends below the surface of the liquid and presents a linear baffle 15 to the passage of hot gases thereunder. An opening 16 is provided in the upper portion of the baffle wall containing a damper 17 therein. This baffle wall is positioned above and supported at or adjacent its mid portion on the above referred to shelf like offset portion of the first wall. This supporting means may take the form of a masonry column 18, as shown in Figure 3, or of any other suitable means, such for example as a Duriron member. The rear end wall 8 is constructed in substantially the same manner as the intermediate wall 7.

Figure 4:
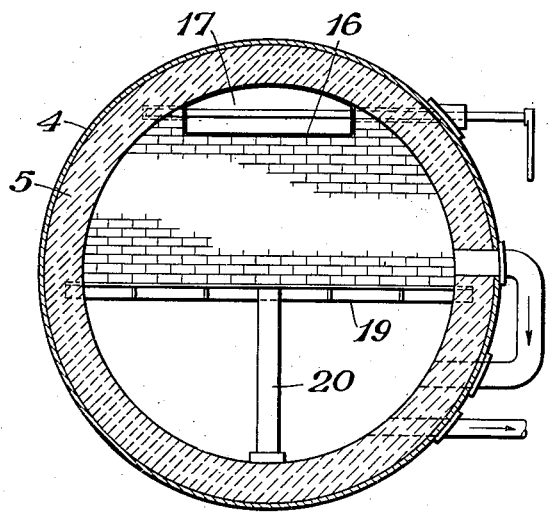
Figure 4 shows an alternate form of construction of the baffle wall.

In Figure 4 I have illustrated an alternate form of baffle wall. Instead of being supported on the forward portion of the shelf-like projection of the wall, the baffle is supported by means of a transverse beam member 19 which in turn is supported adjacent its mid portion by a vertical pillar 20. These supporting members may be Duriron I-beams, for example, as it has been found that I-beams, channel irons and other structural forms made from Duriron when used in the manner shown in Figure 4 are not subject to the breakage so frequent in the case of the Duriron downcomer pipes. This is attributed to the fact that the downcomer pipes cannot be readily supported anywhere except at their upper end. The result is that Duriron downcomer pipes such as disclosed in the patent to Heckenbleikner 1,991,745, February 19, 1935, are subjected to a considerable bending moment, not present in the case of the structural members employed as in Figure 4. When the form of support for the baffle shown in Figure 4 is to be used, it is unnecessary for the separating wall to be formed with the offset shelf-like projection 13.

In the operation of my acid concentrator, the hot gases are delivered from the furnace 1 to the vapor space 21 on the rear side of the baffle wall 25 in the concentrated acid stage, and here divided into two portions 22 and 23 by means of the damper 26, as indicated by the arrows. A definite portion or fraction of the hot gases is forced to bubble through the liquid and under the lower edge 24 of the rear baffle wall 25. The remaining portion of the hot gases is admitted directly into the blending space above the liquid on the opposite side of the baffle wall by means of the damper 26. Here in this blending space the hot gases which have been admitted directly by the damper and the gases which have been bubbled through the liquid are blended together. From this blending space the gases pass into the vapor space 27 at the rear of the baffle wall in the weak acid stage. These gases may all be forced to bubble through the liquid in the weak acid stage under the baffle wall 14 therein and into the vapor space on the forward side of this baffle wall, and hence discharged through the exhaust conduit 28 which leads for example, to the Cottrell precipitator (not shown), or they may be again divided and passed through additional stages.

It is further apparent that in any selected stage, any portion of the total gas flow from a small fraction to the entire total may be bubbled through the liquid thus giving a very flexible arrangement which readily lends itself to the adjustments dictated by the most exhaustive tests.

By dividing the hot gases and passing a definite portion thereof directly into the gas and vapor blending space, a very definite and novel advantage is obtained. The hot gases which are admitted directly to the gas and vapor blending space by means of the damper take out additional moisture from the droplets already suspended due to the agitation caused by that component of the gas bubbled through the liquid. It is thus apparent that a considerable reduction in the amount of gas necessary to be bubbled through the liquid in the concentrated stage is affected. This reduction in hot gas being passed through the liquid in the concentrated acid stage also means a reduction in the agitation of this liquid, and hence a corresponding reduction in the sulphuric acid mist. From this, it also follows that since less gas must be forced through the liquid, a reduction in the necessary blower pressure also results from the use of the present method and apparatus. Furthermore by confining the entire path of all of the hot gas internally of the concentrator shell or drum, rather than passing these gases through conduits located externally thereof, a considerable conservation of heat is effected.

While I have described my invention in connection with certain specific embodiments thereof, it is to be understood that these embodiments are offered by way of illustration, rather than by way of limitation, and that I do not mean to be limited thereby except as indicated in the scope of the appended claims which should be construed as broadly as the prior art will permit.

I claim:

1. An acid concentrating apparatus comprising an acid-proof receiving vessel having enclosing walls, means for introducing acid to and withdrawing acid from said vessel for maintaining a definite liquid level therein, that portion of said vessel above said liquid level forming a vapor space, a source of hot gases under pressure, means for causing a definite fraction of said hot gases to pass directly into the vapor space above the liquid, and the remaining fraction of said hot gases to bubble through the liquid, said last-mentioned means comprising an auxiliary wall in said vessel extending entirely across the vessel and dividing the same into two chambers, a first chamber and a second chamber, said wall presenting a linear baffle edge below the surface of the liquid for the passage of hot gases therebeneath and being formed near its upper portion with an opening of predetermined size, said hot gases being delivered to said first chamber, said opening in said auxiliary wall functioning to pass said definite fraction of said hot gases directly into said vapor space above the liquid level in said second chamber, said linear baffle edge causing the remaining fraction to bubble therebeneath in passing from said first chamber to said second chamber, the two said fractions blending together in the vapor space in said second chamber after said remaining fraction of said hot gases has bubbled through the liquid, and discharge means for discharging said gases from said vapor space.

2. The structure as defined in claim 1 wherein there are provided a plurality of said acid concentrating vessels in series.

3. The structure as defined in claim 1 wherein the said opening in said auxiliary wall is provided with an adjustable damper.

4. An acid concentrating apparatus comprising an acid-proof receiving vessel having enclosing walls, means for introducing acid to and withdrawing acid from said vessel for maintaining a definite liquid level therein, that portion of said vessel above the said liquid level forming a vapor space, a supply of hot gases under pressure, means for causing a definite fraction of said hot gases to pass directly into the vapor space above the liquid level, and the remaining fraction of said hot gases to bubble through the liquid, said last-mentioned means comprising an inwardly extending offset shelf-like projection on the inside lower portion of one of said enclosed walls beneath the liquid level, an auxiliary wall in said vessel extending entirely across said vessel and supported on said shelf-like projection, said wall dividing said vessel into a first chamber and a second chamber, said wall presenting a linear baffle edge below the surface of the liquid for passage of hot gases therebeneath and being formed adjacent its upper portion to define a passageway of predetermined size therethrough, an adjustable damper positioned in said passage, means for delivering said hot gases to said first chamber, said damper being adjusted to pass said definite fraction of said hot gases directly into said vapor space above the liquid level, said linear baffle edge causing the remaining fraction of said gases to bubble beneath the liquid in passing from said first chamber to said second chamber, said hot gases being again intimately contacted with each other in said vapor space in said second chamber, and discharge means for discharging said gases from said vapor space.

5. In a plural stage acid concentrator having enclosing walls, an internal separator wall between two stages, said separator wall comprising a partition wall extending from the bottom of said concentrator to a point slightly below the top of said concentrator, leaving a passageway thereover, a damper mounted for operation in said passageway, a baffle wall spaced from said partition wall and extending from the top of said concentrator to a point below the acid level whereby the hot gases may be made to pass from one stage over said partition wall down between said partition wall and said baffle wall, thence under the edge of said baffle wall through said acid and into the other stage, said partition wall being further characterized by the provision of a forwardly extending shelf-like portion for supporting said baffle wall.

DAVID W. BRANSKY.